(12) United States Patent
Del Cogliano

(10) Patent No.: US 6,978,503 B2
(45) Date of Patent: Dec. 27, 2005

(54) COMBINATION STUD FINDER-HAMMER TOOL

(76) Inventor: Kenneth J. Del Cogliano, 132 Magnolia Cir., Columbiana, AL (US) 35051

( * ) Notice: Subject to any disclaimer, the term of this patent is extended or adjusted under 35 U.S.C. 154(b) by 0 days.

(21) Appl. No.: 10/846,573

(22) Filed: May 17, 2004

(65) Prior Publication Data

US 2005/0251921 A1 Nov. 17, 2005

(51) Int. Cl.[7] .............................. B25D 1/00; B25F 1/00
(52) U.S. Cl. .............................................. 7/143; 7/164
(58) Field of Search ........................... 7/143, 164, 146, 7/147

(56) References Cited

U.S. PATENT DOCUMENTS

| 4,268,927 | A | | 5/1981 | Bridwell |
| 4,700,489 | A | * | 10/1987 | Vasile .......................... 33/342 |
| 5,933,894 | A | | 8/1999 | Bates |
| 6,188,228 | B1 | * | 2/2001 | Philipp ........................ 324/658 |
| 6,205,602 | B1 | | 3/2001 | Dettweiler |
| 2001/0053313 | A1 | * | 12/2001 | Luebke ........................ 408/16 |
| 2003/0201783 | A1 | | 10/2003 | Steber et al. |
| 2004/0016058 | A1 | * | 1/2004 | Gardiner et al. ................ 7/164 |

* cited by examiner

Primary Examiner—Debra S Meislin
(74) Attorney, Agent, or Firm—Charles I. Brodsky

(57) ABSTRACT

A trim-type hammer having a recess in its elongated handle housing a stud finder secured within by a lip having an impact member to mark the location on a sheetrocked wall overlying a stud beneath.

13 Claims, 1 Drawing Sheet

COMBINATION STUD FINDER-HAMMER TOOL

CROSS-REFERENCE TO RELATED APPLICATIONS

NONE

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

NOT APPLICABLE

BACKGROUND OF THE INVENTION

1. Field of the Invention

This invention relates to the hanging of picture frames and the setting of shelves on walls, in general, and to a combination stud finder-hammer tool termed a "Smart Hammer" usable for that purpose, in particular.

2. Description of the Related Art

As is well known and understood, stud finders are oftentimes employed to locate that position on a wall at which a picture frame is to be hung, and where shelves are to be set. Once so located, nails are then typically driven into the wall utilizing a trim hammer of 12 ounce or 16 ounce size. Whether the stud finder operates magnetically or electrically, the usual process involves locating the stud with the finder, putting the finder down, and taking up the hammer to drive the nail in place. (As is known, the magnetic-type of finder locates the stud by detecting the presence of nails by a sensing through the sheetrock. With the electric-type of finder, on the other hand, the stud is located by detecting a change in density behind the sheetrock.) As will become clear from the following description, the present invention essentially comprises a multipurpose tool in which the stud finder and hammer are combined together. Once the stud is found, the tool is used to mark its location, and is then used to hammer the nail in place. These steps are carried out sequentially without having to switch from a finder to a separate hammer as is the practice at present.

SUMMARY OF THE INVENTION

The multipurpose tool of the invention thus includes an elongated handle adapted to receive a hammerhead at one end, and having a recess with an opening at an opposite end. One of a magnetically and electrically operated stud finder is positioned within the recess, and a lip internal of the opening secures the stud finder in place. An impact member—such as a metal nib—outwardly extends from the lip to mark a location on the wall identified as the stud. A metal hammerhead is fitted onto the handle to drive the nails into the stud for holding the picture frame and/or shelf.

In those instances where an electrically operated stud finder is employed, the lip of the multipurpose tool is detachably coupled within the opening of the handle to permit access to the stud finder for changing its battery. Where a magnetic stud finder is employed, on the other hand, the lip may be permanently coupled within the opening. A cap is included to overlie the opening in protecting both the stud finder and the impact member when the combined tool is not being used. Such cap may be resiliently coupled to the handle by means of a rubberized strap. To further protect the stud finder within the recess, a shock absorbing shield may be placed around the finder to retain it in position.

In a preferred embodiment of the invention, the elongated handle is fabricated of a steel or fiberglass composition. A rubberized sleeve surrounds a length of the handle adjacent to the recess, to be grasped in using the tool. Opening the end cap exposes the finder for locating the stud behind the sheetrock and for marking the wall with the impact member. Once done, closing the cap allows the user to drive the nail in place by swinging the metal hammerhead. With a substantially 12 inch overall length for the tool, a 12 or 16 ounce type of trim hammer could be had to locate the stud, to mark its position, and to drive in the nail using but a single tool in this "smart" manner.

BRIEF DESCRIPTION OF THE DRAWINGS

These and other features of the present invention will be more clearly understood from a consideration of the following description, taken in connection with the accompanying drawings, in which.

DETAILED DESCRIPTION OF THE INVENTION

Figure 1A:
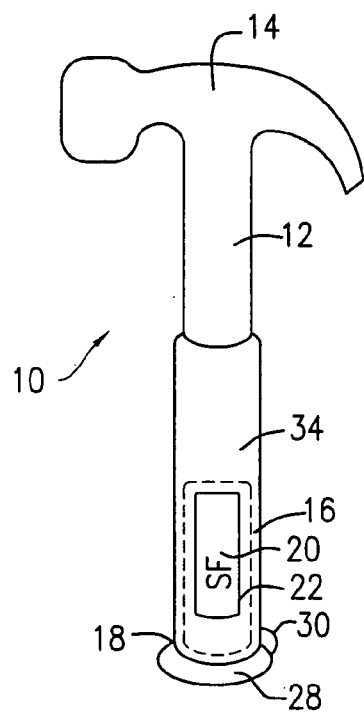
FIGS. 1a–1c are pictorial views helpful in an understanding of the present invention and of its benefits in use.

In the drawings, the multipurpose tool of the invention 10 includes an elongated handle 12 adapted to receive a hammerhead 14 at one end and having a recess 16 within an opening at an opposite end 18. One of a magnetically and electrically operated stud finder 20 is housed within the recess 16—preferably with a shock absorbing shield 22 about it. Such shock absorbing shield 22 may be fabricated of a rubberized composition.

The tool 10 also includes a lip 24 internal of the opening of the handle having an inner diameter less than the outer dimension of the stud finder 20 within the recess 16. Such lip 24 thus secures the stud finder in place, positioned within the recess. An impact member or nib 26—some ⅛ inch in length—extends outwardly from the lip 24 to be used to mark the wall location identified by the finder 20 as overlying a stud behind the sheetrock 45.

A cap 28 overlies the opening in protecting the stud finder and impact member 26 when the multipurpose tool is to be stored—with the cap 28 being fabricated of a rubberized composition. Constructing the cap 28 in this manner allows it to be resiliently coupled to the handle 12 (as by means of a strap 30), but also movable to expose the opening, the lip 24, the eye 32 of the stud finder 20 and the impact member 26 for use. A rubberized sleeve 34 surrounds a length of the handle 12 adjacent to the recess 16. For use as a trim-type hammer in driving nails into the stud for hanging picture frames and for setting shelves in place, the hammerhead 14 may be selected of 12–16 ounce weight.

Figure 1B:
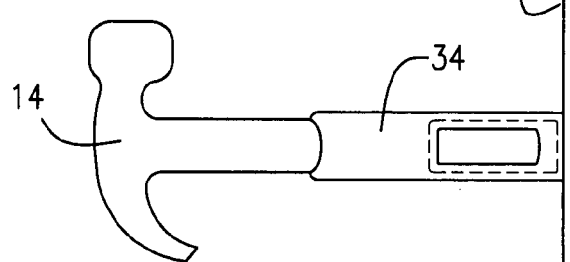
Figure 1C:
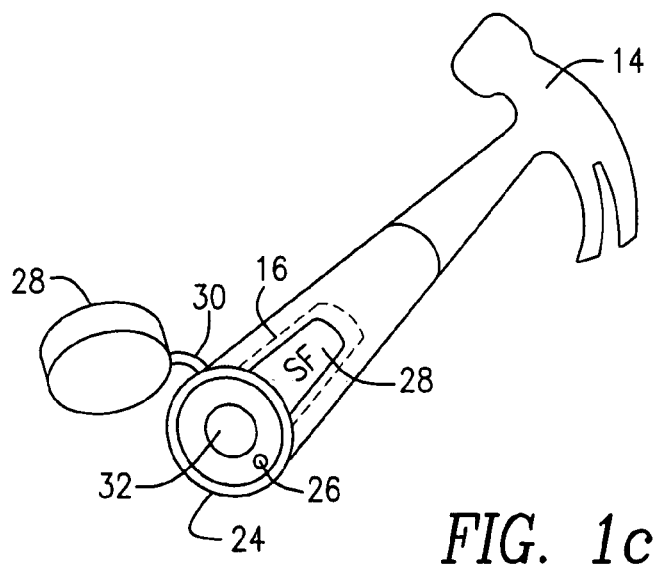

With an overall length of typically 12 inches, the tool is used by first moving the cap 28 from the recess opening (FIG. 1a), thereby exposing the eye 32 of the stud finder 20 (FIG. 1b) and allowing it to be moved along the wall 45 (FIG. 1c). Once a stud is located—either magnetically or electrically, an appropriate alert is given—such as by an audible beeping, or by a flashing light, or both. The nib 26 extending from the lip 24 is then impacted against the wall to mark the stud's location. Once the studs are so located and marked, the cap 28 is closed by means of the strap 30 to protect the lip 24 and the stud finder 20. The handle 12 is then grasped about its sleeve 34 to swing the hammer to drive the appropriate nail into position by means of the hammerhead 14. Once the required number of nails, brads, etc. are secured in this manner, the picture frame could be hung and/or the shelves set in place.

In a preferred embodiment of the invention, the handle 12 is fabricated of steel or fiberglass, hollow at its lower end for providing the recess to receive the stud finder 20. The rubberized sleeve 34 is glued about the handle 12. The lip 24 may be of metal. All that is required for the impact member is that it be able to make a light depression in the sheetrock visible as a location marker for the driving of the nails which follow; a metal nib 26 suffices for this. Where the stud finder is electrically operated, its "ON-OFF" switch could be located at the exposed end of the handle opening.

While there have been described what are considered to be preferred embodiments of the present invention, it will be readily appreciated that modifications can be made by those skilled in the art without departing from the scope of the teachings herein. For at least such reason, therefore, resort should be had to the claims appended hereto for a true understanding of the invention.

What is claimed is:

1. A multipurpose tool for driving a nail into a stud comprising:
    an elongated handle adapted to receive a hammer head at one end and having a recess with an opening at an opposite end;
    one of a magnetically and electrically operated stud finder within said recess;
    a lip internal of said opening securing said stud finder within said recess;
    an impact member outwardly extending from said lip to mark a location on a wall overlying a stud as identified by said finder in use; and
    a hammer hand on said handle at said one end.

2. The multipurpose tool of claim 1, also including a cap overlying said opening in protecting said stud finder and said impact member when said tool is in storage, and movable to expose said opening when said tool is in use.

3. The multipurpose tool of claim 2 wherein said cap is attachably coupled to said elongated handle, and resiliently positionable with respect thereto.

4. The multipurpose tool of claim 3 wherein said cap is fabricated of a rubberized composition.

5. The multipurpose tool of claim 1 wherein said lip is fabricated of a metal composition.

6. The multipurpose tool of claim 1 wherein said impact member includes a metal nib.

7. The multipurpose tool of claim 1, also including a shock absorbing shield about the stud finder within said recess.

8. The multipurpose tool of claim 7 wherein said shock absorbing shield is fabricated of a rubberized composition.

9. The multipurpose tool of claim 1 wherein said handle is fabricated of one of a steel and fiberglass composition, with a rubberized sleeve surrounding a length thereof adjacent said recess.

10. The multipurpose tool of claim 1 wherein said hammer head is of metal providing an overall length of substantially 12 inches for said tool, and a weight of one of substantially 12 ounces and 16 ounces.

11. A multipurpose tool for driving a nail into a stud comprising;
    an elongated handle adapted to receive a hammer head at one end and having a recess with an opening at an opposite end;
    one of a magnetically and electrically operated stud finder within said recess;
    a lip internal of said opening securing said stud finder within said recess; and
    an impact member outwardly extending from said lip to mark a location on a wall overlying a stud as identified by said finder in use;
    including a metal hammerhead on said handle providing an overall length of substantially 12 inches for said tool, and a weight of substantially 12–16 ounces;
    also including a cap overlying said opening in protecting said stud finder and said impact member when said tool is in storage, and movable to expose said opening when said tool is in use; and
    additionally including a shock absorbing shield about the stud finder within said recess; and
    wherein said handle is fabricated of one of a steel and fiberglass composition, with a rubberized sleeve surrounding a length thereof adjacent said recess.

12. The multipurpose tool of claim 11 wherein said cap is attachably coupled to said elongated handle, and resiliently positionable with respect thereto.

13. The multipurpose tool of claim 11 wherein said impact member includes a metal nib.

* * * * *